N. W. WHEELER.
STEERING APPARATUS.
No. 8,712. Patented Feb. 3, 1852.
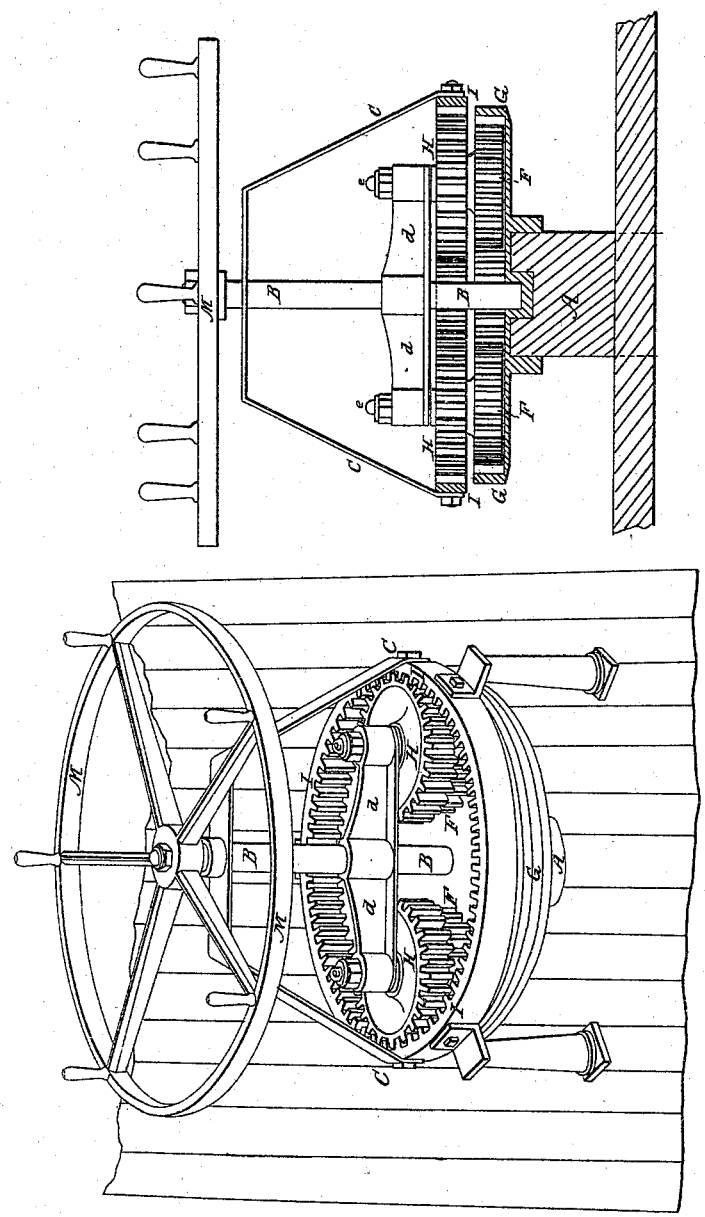

UNITED STATES PATENT OFFICE.

NORMAN W. WHEELER, OF BUFFALO, NEW, YORK.

STEERING APPARATUS.

Specification of Letters Patent No. 8,712, dated February 3, 1852.

*To all whom it may concern:*

Be it known that I, NORMAN W. WHEELER, of the city of Buffalo, in the county of Erie and State of New York, have invented a new and useful Improvement in Apparatus for Steering Vessels, of which the following is a full, clear, and exact description, reference being had to the accompanying drawing, which forms part of this specification, and which represents views in perspective and in section of my steering apparatus.

My improved steering apparatus consists of a combination of two concentric differential cog wheels or racks, one of which is stationary while the other is secured to the rudder head, with pinions which are connected together and made to traverse around the differential wheels by the turning of the steering wheel; the operation of the whole being such that the angular movement of the rudder is reduced so much below that of the steering wheel that a small force applied to the latter is sufficient to turn or hold the rudder even of a vessel of the largest size.

In the accompanying drawing A is the rudder head, on which an upright shaft B is stepped. This shaft is fitted at its upper extremity with a steering wheel M and is supported in an erect position by means of a frame C, which is mounted upon the deck of the vessel. The upright shaft is also fitted with two arms, $d\ d$, which project from it in opposite directions and carry at their outer extremities two upright spindles $e\ e$. These spindles are fitted with sleeves to whose lower extremities planet wheels or pinions F are secured, whose teeth engage with those of an annular rack or wheel G which is secured to the rudder head; the sleeves have also pinions H secured to them whose teeth engage with those of an annular rack or wheel I which is secured to the deck of the vessel.

It will now be seen that if the number of teeth on the upper pinions bear the same proportion to the number of teeth of the annular wheel with which they engage, as the number of teeth of the lower pinions bear to their respective annular wheel, the turning of the steering wheel will not produce any movement in the rudder; but if the relative proportion of the teeth of the one set of pinions and wheel be different from that of the other set, then the rudder will be turned, and the movement will be either in the same direction as the steering wheel or in the opposite direction as the proportion of the lower set of pinions to the wheel on the rudder is less or greater than that of the upper set of pinions to the stationary wheel. The movement of the rudder with respect to the steering wheel is therefore dependent upon the difference in the relative proportions of the two wheels and their respective pinions. In the present example the wheel I has 58 teeth and its pinions 24 teeth; the wheel G has 54 teeth and its pinions 20 teeth, the proportion of the latter set to their wheel is therefore less than that of the former and the rudder turns in the same direction as the steering wheel is turned. The movement of the former with respect to the latter is in the ratio of 1 to 9.53.

The apparatus thus constructed is not only efficient in its operation but extremely simple in its construction, as it is composed of few parts and they are readily formed and put together. The differential principle involved may also be carried to any desirable extent by varying the proportions without increasing the number of the parts so that the power exerted by a single man or boy may be sufficient to steer a vessel of the largest size.

It is obvious that more than two sets of pinions may be used and I intend to use any number that may be required to impart the requisite strength to the mechanism.

Having thus described my improved steering apparatus what I claim therein as new and desire to secure by Letters Patent is—

The combination of fast and moving circular racks of different diameters with corresponding planet-wheels or pinions connected together and actuated by the hand wheel as herein set forth.

In testimony whereof I have hereunto subscribed my name.

NORMAN W. WHEELER.

Witnesses:
　THOS. SHIELS,
　AMOS F. FAY.